UNITED STATES PATENT OFFICE.

BYRON B. GOLDSMITH, OF NEW YORK, N. Y.

PROCESS FOR ENAMELING LEATHER.

No. 909,288.  Specification of Letters Patent.  Patented Jan. 12, 1909.

Application filed November 28, 1903. Serial No. 183,021.

*To all whom it may concern:*

Be it known that I, BYRON B. GOLDSMITH, a citizen of the United States, residing in the city and State of New York, have invented a new and useful Improvement in Processes for Enameling Leather, of which the following is a specification.

My invention has reference to an improvement in the process of manufacturing patent or enameled leather.

The process of manufacturing patent leather, which is now still in use to a considerable extent, consists in the repeated application to the leather or fibrous material of layers of linseed oil varnish, whether mixed or unmixed with suitable pigments. It has also more recently been proposed to coat leather, in the manufacture of patent leather, with a preparatory coating of pyroxylin mixed with other substances and to superimpose a coating of enamel or linseed oil varnish thereupon to produce the gloss. In carrying out this last mentioned process, however, a certain difficulty is encountered. After the linseed oil varnish has been applied upon the pyroxylin coating and has been allowed to dry, it has been found that the oil frequently dries in drops, as distinguished from a continuous unbroken surface. Especially is this the case when the pyroxylin compound has completely covered up the fibrous structure of the base, forming practically a pyroxylin surface. Even if this drying in drops does not take place at once, it is found to take place when the coated surfaces, as is generally necessary, are placed in a drying room to complete the drying. The reason for this action seems to be found in the fact that the linseed oil varnish does not unite with the pyroxylin base and is shed by it, just as water would be. Even in the cases where it is possible to get the linseed oil varnish to dry evenly on the under surface containing pyroxylin, it is found that the linseed oil varnish adheres so poorly to the under pyroxylin coating that it readily flakes off in the finished article and thus makes the product comparatively useless.

My invention relates to an improved process by which the defects in manufacture just outlined are overcome and the imperfections in the finished product are avoided. To this end I mix the linseed oil or drying oil varnish, which is to be applied to the coating of pyroxylin compound, with pyroxylin in solution. If now the fibrous surface has been coated with one or more layers of a coating in such a manner that the coating last applied is a coating consisting of or containing pyroxylin or a pyroxylin compound, I apply upon this pyroxylin surface one or more gloss giving coatings consisting of a mixture of linseed oil varnish or a drying oil and a solution of pyroxylin. I thus obtain the gloss which has heretofore been produced by linseed oil or drying oil varnishes and additionally effect the result that the coat of the mixture of the linseed oil varnish and pyroxylin will intimately unite with the under surface of the pyroxylin or pyroxylin compound to which it is applied. By this means I avoid the drying in drops of linseed oil varnishes when applied to an under surface containing or consisting of pyroxylin and I produce a finished product in which there is no tendency for the coating containing linseed oil to flake off or to crack, as has heretofore been the case when drying oil varnishes have been applied to an under surface containing pyroxylin.

While I have spoken of a mixture of linseed oil or drying oil varnish and a solution of pyroxylin as a coating to be applied to an under surface containing pyroxylin for the purpose of increasing the gloss, it is manifest that other substances, such as substances which increase the flexibility of the coating, like non-drying oils, or pigments and the like, can be added to this mixture of linseed oil varnish and a solution of pyroxylin for giving appropriate qualities to the gloss coating.

To give a specific example, I may prepare a solution of pyroxylin in amyl acetate taken by itself or mixed with benzin or turpentine. Thus I may add six ounces of pyroxylin to one gallon of amyl acetate. To 80 cubic centimeters of this solution, I may add 80 cubic centimeters of linseed oil or linseed oil varnish, that is to say linseed oil which has been boiled with suitable driers. At the same time, it is to be understood that the proportions of pyroxylin and drying oil varnish can be varied within wide limit, it being understood that the greater the proportion of drying oil, the greater, in general, will be the gloss which the coating imparts. Nor is it necessary, in case a number of coats of the mixture of pyroxylin and drying oil varnish are applied, that the proportions of the ingredients in each coating be the same. I thereupon take the skin and apply one or more suitable coatings in such a manner that the coating last to be applied consists of or contains pyroxylin. To this under pyroxylin surface, I then apply one or more coatings of the mixture of a drying oil varnish and a solution of pyroxylin. I preferably stop here. But I may add coatings of other substances to produce any desired qualities in the finished product.

I may specify another advantage of my process, in addition to those specified in a prior portion of this specification. Patent leather, as made today must, after it has been baked in ovens, be exposed to sunlight for some days before it can be shipped, in order to remove the stickiness from the surface. This stickiness is due to the linseed oil varnish on the surface. When, however, such surface coating has pyroxylin mixed therewith, it is generally unnecessary to expose it to sunlight unless there is a very large proportion of oil in the last coating. Since sunlight is not always to be had, the old method is often interfered with by weather conditions and requires a large plant, whereas by my process I may cause the last coat to be applied to consist of such mixture of a solution of pyroxylin and a drying oil varnish, as will not render sun drying of the product necessary after the final baking. I may also state that in some cases, although with not perhaps the same degree of utility, I may mix my linseed oil varnish with a solvent of pyroxylin instead of with a solution of pyroxylin and then proceed in the manner hereinbefore described with reference to the mixture of pyroxylin and drying oil varnish.

It is almost unnecessary to add that I may not use resin as a form of drying oil to mix with pyroxylin to apply upon the pyroxylin coat upon the leather surface. A resin varnish for gloss giving purposes is useful on articles of wood and the like but could not be used in the present art of enameling leather since it would cause the leather to crack.

I claim,—

1. The process of enameling leather which consists in supplying it with a surface containing pyroxylin and then applying thereto a solution containing pyroxylin and a drying oil, substantially as described.

2. The process of enameling leather which consists in supplying it with a surface containing pyroxylin and then applying thereto a solution containing pyroxylin, a drying oil and a flexibility-imparting substance, substantially as described.

3. The method of enameling leather which consists in supplying it with a surface containing pyroxylin, and then applying thereto a mixture consisting of a solvent of pyroxylin and a drying oil, substantially as described.

4. Enameled leather having among its coats a coating containing pyroxylin, and a coat containing a drying oil and pyroxylin superposed thereon, substantially as described.

5. The process of enameling leather which consists in supplying it with a surface containing pyroxylin and then applying thereto a solution containing pyroxylin and boiled linseed oil, substantially as described.

In testimony whereof I have signed my name to this specification in the presence of two subscribing witnesses.

BYRON B. GOLDSMITH.

Witnesses:
M. TETZLOFF,
F. T. CHAPMAN.